United States Patent
Kimpe

(10) Patent No.: US 9,986,427 B2
(45) Date of Patent: May 29, 2018

(54) METHOD AND DEVICE FOR IMAGE AND VIDEO TRANSMISSION OVER LOW-BANDWIDTH AND HIGH-LATENCY TRANSMISSION CHANNELS

(71) Applicant: BARCO N.V., Kortrijk (BE)

(72) Inventor: Tom Kimpe, Ghent (BE)

(73) Assignee: BARCO N.V., Kortrijk (BE)

( * ) Notice: Subject to any disclaimer, the term of this patent is extended or adjusted under 35 U.S.C. 154(b) by 0 days. days.

(21) Appl. No.: 14/311,781

(22) Filed: Jun. 23, 2014

(65) Prior Publication Data

US 2014/0304332 A1 Oct. 9, 2014

Related U.S. Application Data

(62) Division of application No. 10/567,307, filed as application No. PCT/BE2005/000173 on Nov. 25, 2005, now abandoned.

(Continued)

(51) Int. Cl.

| | |
|---|---|
| *H04N 7/12* | (2006.01) |
| *H04N 11/02* | (2006.01) |
| *H04N 11/04* | (2006.01) |
| *H04W 12/02* | (2009.01) |
| *G06F 21/62* | (2013.01) |
| *H04N 21/258* | (2011.01) |
| *H04L 29/08* | (2006.01) |

(Continued)

(52) U.S. Cl.
CPC ........ *H04W 12/02* (2013.01); *G06F 21/6245* (2013.01); *H04L 67/2842* (2013.01); *H04L 67/42* (2013.01); *H04N 19/12* (2014.11); *H04N 19/127* (2014.11); *H04N 19/132* (2014.11); *H04N 19/154* (2014.11); *H04N 19/164* (2014.11); *H04N 19/17* (2014.11); *H04N 19/172* (2014.11); *H04N 19/20* (2014.11); *H04N 19/37* (2014.11); *H04N 19/423* (2014.11); *H04N 19/61* (2014.11); *H04N 19/90* (2014.11); *H04N 21/25841* (2013.01); *H04N 21/25858* (2013.01); *H04W 4/026* (2013.01); *H04W 4/04* (2013.01)

(58) Field of Classification Search
CPC .............................. H04N 7/50; H04N 7/26244
USPC ..................................................... 375/240.24
See application file for complete search history.

(56) References Cited

U.S. PATENT DOCUMENTS

| | | |
|---|---|---|
| 5,063,603 A | 11/1991 | Burt |
| 5,892,847 A | 4/1999 | Johnson |

(Continued)

FOREIGN PATENT DOCUMENTS

| | | |
|---|---|---|
| EP | 1316457 A1 | 1/2004 |

*Primary Examiner* — Chikaodili E Anyikire
(74) *Attorney, Agent, or Firm* — Bacon & Thomas, PLLC

(57) ABSTRACT

A method for transmission of images and/or video over bandwidth limited transmission channels having varying available bandwidth, which uses a classification algorithm to decompose the images and/or video to be transmitted into multiple spatial areas, each area having a specific image type; detecting the image type of each of those areas; and separately selecting for each of those areas an image and/or video encoding algorithm having a compression ratio. The classification algorithm is used to prioritize each of the areas, increase the compression ratio of the image and/or video encoding algorithm dedicated to spatial areas having lower priority in case of decreasing bandwidth.

24 Claims, 4 Drawing Sheets

Related U.S. Application Data

(60) Provisional application No. 60/649,576, filed on Feb. 4, 2005.

(51) Int. Cl.

| | | |
|---|---|---|
| *H04L 29/06* | (2006.01) | |
| *H04N 19/172* | (2014.01) | |
| *H04N 19/61* | (2014.01) | |
| *H04N 19/37* | (2014.01) | |
| *H04N 19/12* | (2014.01) | |
| *H04N 19/127* | (2014.01) | |
| *H04N 19/132* | (2014.01) | |
| *H04N 19/154* | (2014.01) | |
| *H04N 19/164* | (2014.01) | |
| *H04N 19/17* | (2014.01) | |
| *H04N 19/20* | (2014.01) | |
| *H04N 19/423* | (2014.01) | |
| *H04N 19/90* | (2014.01) | |
| *H04W 4/02* | (2018.01) | |
| *H04W 4/04* | (2009.01) | |

(56) References Cited

U.S. PATENT DOCUMENTS

| | | | |
|---|---|---|---|
| 6,037,991 | A | 3/2000 | Thro et al. |
| 6,182,133 | B1 * | 1/2001 | Horvitz ............. G06F 17/30902 707/999.008 |
| 6,304,677 | B1 * | 10/2001 | Schuster ................ G06K 9/222 345/442 |
| 6,404,928 | B1 | 6/2002 | Shaw et al. |
| 6,553,150 | B1 | 4/2003 | Wee et al. |
| 6,965,457 | B2 | 11/2005 | Nakanishi et al. |
| 2002/0046404 | A1 | 4/2002 | Mizutani |
| 2002/0133589 | A1 | 9/2002 | Gubbi et al. |
| 2003/0118234 | A1 | 6/2003 | Tanaka et al. |
| 2004/0105019 | A1 | 6/2004 | Imanishi et al. |
| 2006/0047804 | A1 * | 3/2006 | Fredricksen ...... G06F 17/30902 709/224 |
| 2006/0294125 | A1 | 12/2006 | Deaven |

\* cited by examiner

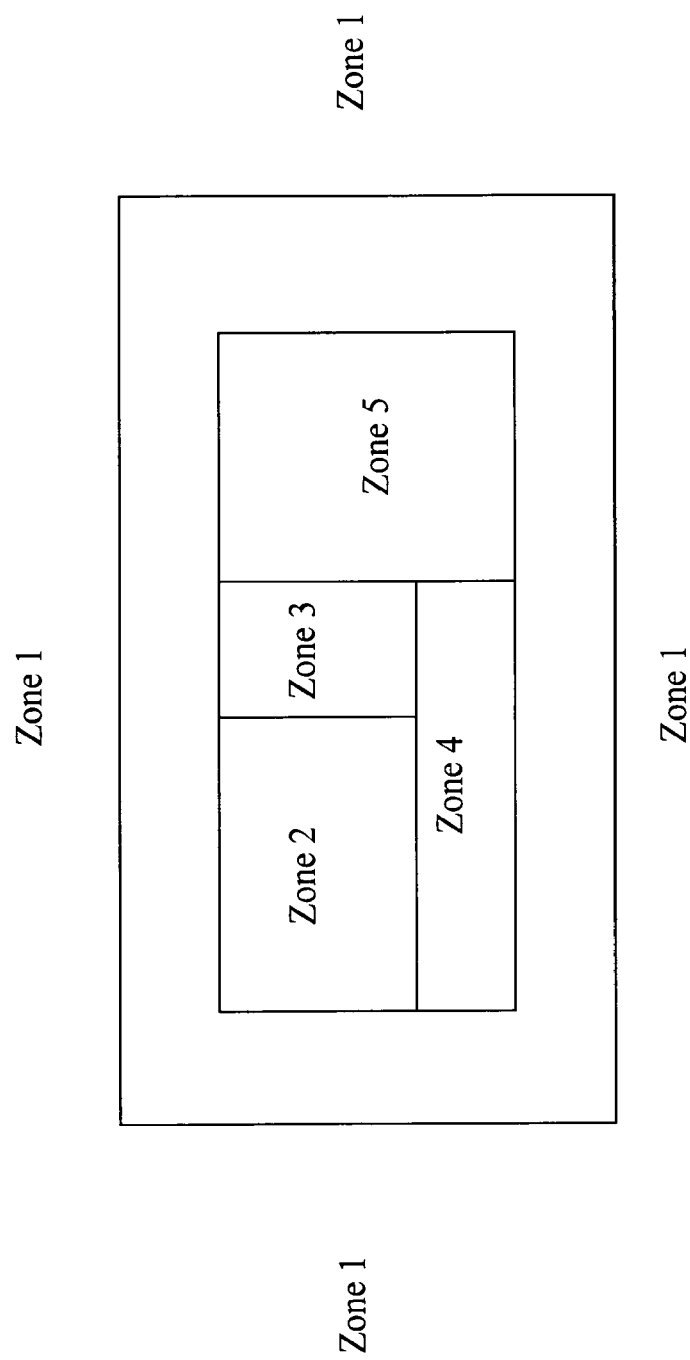

METHOD AND DEVICE FOR IMAGE AND VIDEO TRANSMISSION OVER LOW-BANDWIDTH AND HIGH-LATENCY TRANSMISSION CHANNELS

TECHNICAL FIELD OF THE INVENTION

The present invention relates to systems and methods for transmission of high quality images and video over (wireless) bandwidth limited, lossy and high-latency transmission channels. With "high quality images and video" is typically meant "medical images and video". More particularly, the invention relates to systems and methods for transmitting images and video over channels such as Wifi, UWB, Bluetooth, DECT, ZigBee, . . . and provides solutions for typical problems such as overall low image quality at higher compression ratio and high latency.

BACKGROUND OF THE INVENTION

This invention is in the field of methods and systems for transmitting images or video over channels where there is a bandwidth limitation present, where the channel possibly is lossy or where latency is important. The general problem to solve is the transport of high-quality images or video from one point to another. Because of the bandwidth limitations of the channel used it may be necessary to tolerate some decrease in image or video quality, this is for instance the case when the image or video data is compressed in a lossy way before sending it over the channel. In that case the decompressed image or video sequence will be of lower quality than the original image or video sequence. Frequently used compression schemes are JPEG, JPEG2000, MPEG-2, . . . . Each of these compression schemes has its advantages and disadvantages related to compression ratio, complexity of the scheme, calculation power needed, introduced latency, . . . and the best compression scheme to use also typically depends on the contents of the image or video that is compressed. For example: a medical image would require another compression scheme for optimal quality and compression ratio than a clip-art picture. Especially for demanding applications such as medical imaging a general decrease in image quality might not be acceptable so the bandwidth limitations clearly are in conflict with the need for high quality of at least the medical image being transmitted.

In case the transmission channel has a significant bit-error-rate (if the channel introduces errors in the transmitted data) then the degradation of the image or video quality might be totally unacceptable. Especially the combination of bit errors and compressed data typically introduces large errors in the decompressed data stream. This problem is referred to as error resilience. One possible solution in case of channels with high bit-error-rate is to use error detection codes or error correcting codes (ECC). These codes allow for detecting and even correcting bit errors within certain limitations. Examples of error correcting codes are CRC (cyclic redundancy codes) and RS (Reed-Solomon codes).

Apart from possible quality degradation compression also adds some extra latency because it takes time to compress and to decompress the stream. In some applications latency is a big problem. This is in particular the case if the data traffic is bi-directional. This is for example the case if a server generates video sequences, this video data is transmitted to the client, and the client has the possibility to interact with the server (by moving a mouse pointer for instance). In that case a high latency will immediately be visible as slow response of the system: it will take an unacceptable long time before the result of an action (mouse movement for example) of the client will take effect.

Furthermore, the device that receives the image or video data will typically be a portable device and therefore will have a wireless interface to the server. This aspect of portability results in extra complication what concerns power consumption, signal integrity (varying signal quality and possible loss of connection with the server) and security aspects. Indeed, portable devices are normally battery powered and to reach a useful battery operation time it is required to minimize the power consumption as much as possible. This conflicts with the bandwidth limitations of typical transmission channels (Wifi 802.11.a/b/g/ . . . , DECT, ZigBee, UWB, . . . ): because of the low available bandwidth a high compression ratio is needed and this typically requires a complex compression scheme. The complexity of the compression scheme is directly related to power consumption, as extra calculations require additional power. Portable devices also suffer from varying signal quality. With Wifi for instance, moving the device only a few meters can result in only half the available bandwidth because of complex reflections and inference of the wireless signal. Worst case, the signal can even fade away completely (for a limited time). In such a situation it is of course not desired that the portable device cannot be used at that moment. Because the data is transmitted wirelessly it is easier for other people to receive the data. In case the data is confidential (such as medical images or patient data) this will need extra precautions such as encryption algorithms.

SUMMARY OF THE INVENTION

It is an object of the present invention to provide a method and device to solve problems that currently exist with transmission of image- and video transmission over bandwidth-limited networks, in particular high-quality or medical image- and video transmission. Such problems are e.g., but not limited thereto, low overall image/video quality when only a low bandwidth channel is available, severe image degradation due to introduction of bit errors on the channel and the problem of latency when communication is bidirectional. The present invention will disclose a solution based on automatic selection of the best codec type depending on spatial location in the image, methods to improve security and priority signalling in a multi-user environment, methods to make maximum use of available calculation power by automatically reconfiguring calculation blocks, methods to reduce and hide high latency problems, and methods to reduce power consumption for portable battery-operated devices.

In a first aspect, the present invention provides a method for transmission of images and/or video, in particular e.g. high quality images and/or video, over bandwidth limited transmission channels having varying available bandwidth, between a server and multiple devices. With "high quality images and/or video" is typically meant "medical images and/or video". Available bandwidth may be varying due to the intrinsic bandwidth being varying e.g. in case of wireless transmission, or, in case of a fixed bandwidth being present, due to variable load or variable throughput. The method according to the present invention comprises the use of a classification algorithm for each of the images and/or video to be provided to a device, for:

decomposing the images and/or video to be transmitted into multiple spatial areas, each area having a specific image type;

detecting the image type of each of those areas
separately selecting for each of those areas an image and/or video encoding algorithm having a compression ratio.

According to the present invention, each of the devices are prioritized, and the classification algorithm increases the compression ratio of the image and/or video encoding algorithms dedicated to a device having lower priority in case of decreasing bandwidth.

According to embodiments of the present invention, the prioritizing of the devices may be done based on the applications accessed through each of the devices. Alternatively, according to embodiments of the present invention, the prioritizing of the devices may be done based on the identity of users using said devices, e.g. whether the user is a doctor or an assistant. The method then may include a step of user log-on to one of the devices. Alternatively, according to embodiments of the present invention, the prioritizing of the devices may be done based on location of the devices, e.g. whether a device is in an emergency room or in a consultation room.

The method may be used in a hospital environment.

In a second aspect, the present invention provides a method for securing transmission of data from a server to a portable imaging device, the method comprising:
determining the exact position of the portable imaging device with respect to an authorised area,
based on determined the exact position of the portable imaging device, determining whether the portable device is authorized to receive specific data over a predetermined transmission channel,
transmitting, from the server to the portable imaging device, the specific data requested if authorisation is granted, the portable imaging device having a display area.

The method furthermore comprises the step of removing at least from the display area at least confidential data when the portable imaging device leaves the authorised area.

According to embodiments of the present invention, the method furthermore may be adapted for showing at least on the display area at least confidential data when the portable imaging device enters the authorised area. According to embodiments of the present invention, the method may furthermore be adapted for removing at least confidential data from volatile and/or non-volatile memory elements within the portable imaging device when the portable imaging device leaves the authorised area.

Possibly, according to embodiments of the present invention, the method may furthermore comprise encrypting confidential data when the portable imaging device leaves the authorised area. According to embodiments of the present invention, the method may comprise a step of decrypting confidential data when the portable imaging device enters the authorised area. According to embodiments of the present invention, the method may furthermore comprise the using of a different transmission channel for transmitting the requested data, the transmission channel used depending on the determined the exact position of the portable imaging device. According to embodiments of the present invention, the portable imaging device may determine which transmission channel to use for transmitting the requested data. Alternatively, the server may determine which transmission channel to use for transmitting the requested data.

The method may be used in a hospital environment.

In a third aspect, the present invention provides a method for reducing latency in a client-server computer system, the server being adapted for generating data at least dependent on one or more parameter values, the method comprising the steps of:
predicting possible reachable future parameter values, predicting possible future parameter values is performed by the client, after which these predicted parameter values are sent to the server;
generating data corresponding to the predicted parameter values, and sending this data to the client, and
the client caching this generated data corresponding to parameter values for future use.

According to embodiments of the present invention, the client may use the cached data when a corresponding parameter value is set. According to embodiments of the present invention, the client may use the cached data when a parameter value is set which falls within a predetermined range around the parameter valued for which the cached data had been generated.

The method may be used in a hospital environment.

In a fourth aspect, the present invention provides a method for transmission of images and/or video, in particular e.g. high quality images and/or video, over bandwidth limited transmission channels having varying available bandwidth. With "high quality images and/or video" is typically meant "medical images and/or video". Available bandwidth may be varying due to the intrinsic bandwidth being varying e.g. in case of wireless transmission, or, in case of a fixed bandwidth being present, due to variable load or variable throughput. The method comprises the use of a classification algorithm for
decomposing the images and/or video to be transmitted into multiple spatial areas, each area having a specific image type;
detecting the image type of each of those areas;
separately selecting for each of those areas an image and/or video encoding algorithm having a compression ratio.

According to the present invention, the classification algorithm is adapted to prioritize each of the areas, the classification algorithm increasing the compression ratio of the image and/or video encoding algorithm dedicated to spatial areas having lower priority in case of decreasing bandwidth.

According to embodiments of the present invention, the method may be used in a hospital environment.

In a fifth aspect, the present invention provides a method for transmission of images and/or video, e.g. high quality images and/or video, over a transmission channels from a server to a client. With "high quality images and/or video" is typically meant "medical images and/or video". The method comprises the steps of
decomposing the images and/or video to be transmitted into multiple spatial areas, each area having a specific image type;
detecting the image type of each of those areas;
separately selecting for each of those areas an image and/or video encoding algorithm using a code for encoding the images and/or video of the area. According to the embodiments of the invention, the client is a reconfigurable device. The method further comprises the step of reconfiguring this reconfigurable device for decoding the images and/or video of the areas.

According to embodiments of the present invention, the method may further comprise the steps of
adaptation of the encoding algorithms used for the encoding, the adaptation being based on current or predicted transmission channel properties;

reconfiguring the reconfigurable device for decoding the images and/or video of the areas, based on the adapted image and/or video encoding algorithms.

According to embodiments of the present invention, all used image and/or video encoding algorithms may be available at the reconfigurable device. Alternatively, according to embodiments of the present invention, only part of the image and/or video encoding algorithms may be available at the reconfigurable device, whereas the method further comprises the step of downloading image and/or video encoding algorithms not being available at the reconfigurable device. According to embodiments of the present invention, the downloaded image and/or video encoding algorithms may be saved at the reconfigurable device.

According to embodiments of the present invention, the image and/or video encoding algorithms to be downloaded may be sent over a separate connection between server and reconfigurable device.

According to embodiments of the present invention, the reconfiguration may be a partial reconfiguration of the reconfigurable device. The reconfiguration may be done from server.

The method may be used in a hospital environment.

In a sixth aspect; the present invention provides a method for transmission of images and/or video, e.g. high quality images and/or video over bandwidth limited transmission channels having varying available bandwidth. With "high quality images and/or video" is typically meant "medical images and/or video". Available bandwidth may be varying due to the intrinsic bandwidth being varying e.g. in case of wireless transmission, or, in case of a fixed bandwidth being present, due to variable load or variable throughput. The method comprises the use of a classification algorithm for
  decomposing the images and/or video to be transmitted into multiple spatial areas, each area having a specific image type;
  detecting the image type of each of those areas
  separately selecting for each of those areas an image and/or video encoding algorithm having a compression ratio.
The method further comprises the steps of
  encoding each of the areas by an image and/or video encoding algorithm
  transmitting the encoded images and/or video;
  decoding each of the areas by an image and/or video encoding algorithm;
  wherein prior to encoding at least one of the area is provided with padding pixels, which padding pixels are replaced by part of one of the other areas during decoding.

According to embodiments of the present invention, the padding pixels represent zones where at least two areas overlap.

The method may be used in a hospital environment.

BRIEF DESCRIPTION OF THE DRAWINGS

FIG. 5 schematically shows a hospital environment wherein a number of transition zones are defined

DETAILED DESCRIPTION

Figure 1:
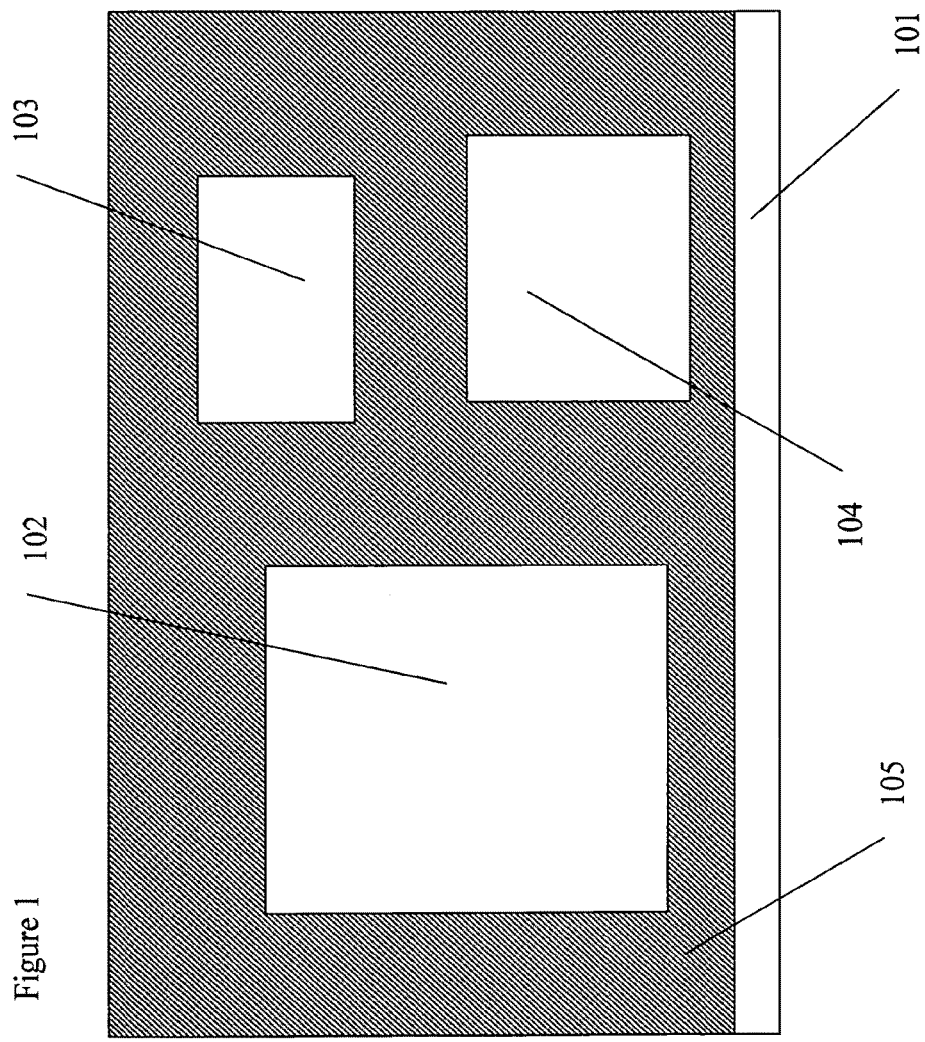
FIG. 1 schematically shows a desktop comprising an image and/or video for transmission over bandwidth limited transmission channels having varying available bandwidth.
Figure 2:
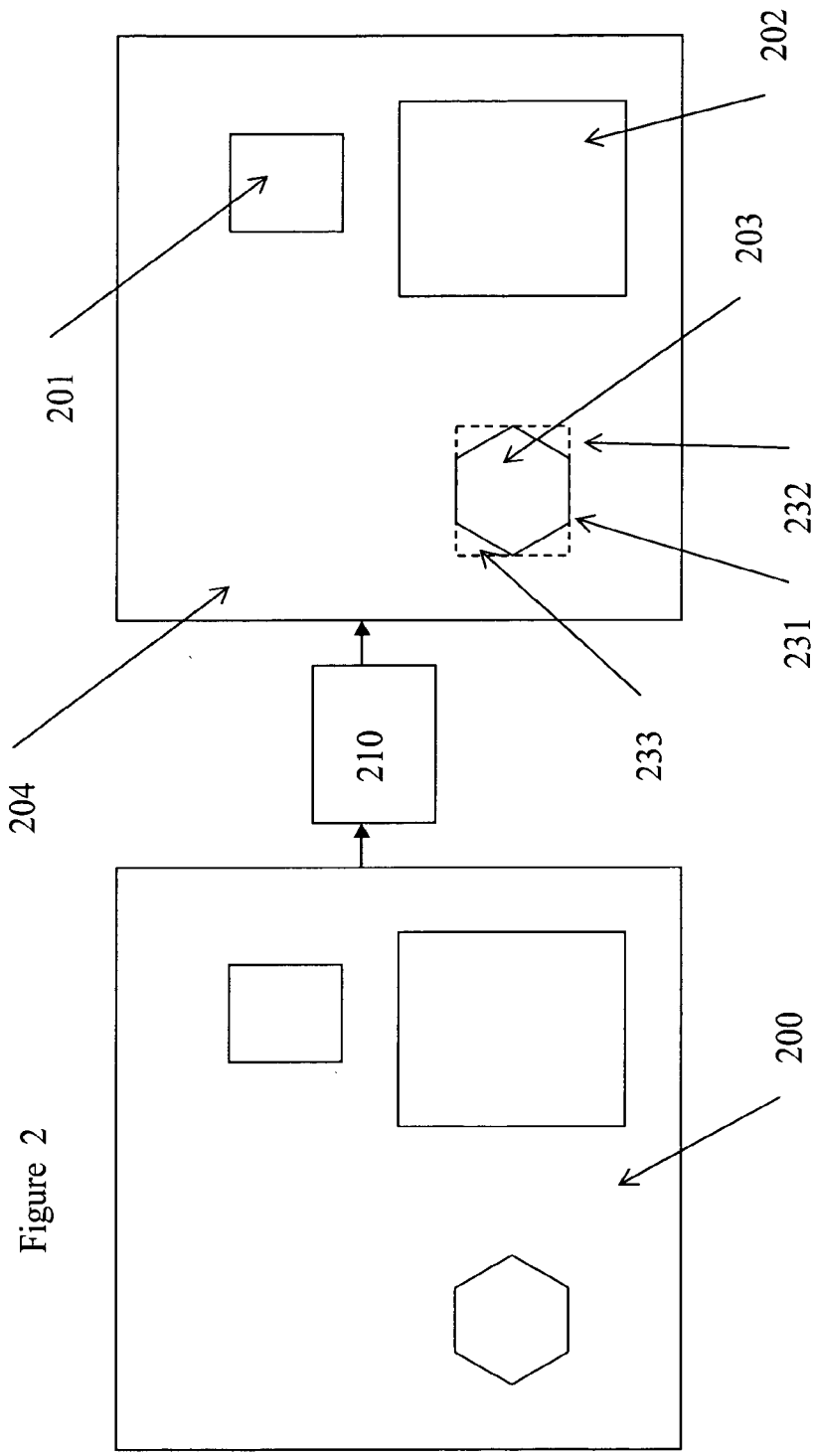
FIG. 2 schematically illustrates the use of a classification algorithm for examination of a total area of an image and/or video for transmission over bandwidth limited transmission channels having varying available bandwidth.

According to a first aspect of the present invention, a method and system are disclosed that allow for higher overall image quality compared to existing methods, when only a limited bandwidth is available. This is achieved by decomposing the image/video to be transmitted into multiple spatial areas, each having a specific image type, and detecting the image type of each of those areas and selecting the optimal image/video codec for those areas. Selecting the optimal image codec could mean optimizing on image quality (PSNR, MSE), optimising on compression ratio, optimizing on latency of the encoding/decoding process, optimizing to subjective image quality based on a model of the human vision system . . . . Decomposing the image/video could mean splitting the image/video stream into rectangular areas, each area having a specific image type. For example: if the desktop of a PC is to be replicated somewhere else then the desktop contents will have to be transmitted over a channel and the desktop will be displayed again at the receiving side. In case the channel is bandwidth-limited then typically encoding (compression) will be performed before sending the data over the channel and decoding (decompression) the data at the receiver side. The typical situation is that the desktop will consist of multiple areas: for instance there can be an area containing a task bar, there can be an area containing a text document, there can be an area containing photographs, yet another area can contain a video sequence and there can also be some part of the desktop background visible. The present situation is that the desktop will be compressed as a unit using some particular compression scheme. However, according to the present invention, at the transmitter side one will detect that the desktop 100 as shown in FIG. 1 consists of several image types and for each of those areas a different compression scheme can be used. For the taskbar area 101 one could for instance use a lossy compression algorithm based on JPEG2000, for the text document 102 one could use a simple run-length-encoding as this will compress text data well at low complexity, for the photograph 103 one could use a lossless JPEG-LS scheme because one wants the photograph to be displayed correctly and for the video area 104 one could use a very complex MPEG-4 video compression codec that achieves very high compression ratio but also introduces high latency. The background area 105 can be heavily compressed using JPEG or could even be replaced by a plain background to save bandwidth. Detection of the image areas and according types can be done automatically or with help from the application generating the contents. In the first situation a classification algorithm will examine the total area to be transmitted and decompose the area into one or more objects of specific image type. The classification algorithm can be for instance a neural network classifier, a pattern recognition algorithm, a histogram analysis algorithm, an algorithm that takes information from the operating system about window locations and types, . . . . It is also possible that the classification algorithm takes the temporal component into account. In other words: it is much easier to identify a video/movie stream if one also compares consecutive frames instead of only examining the data within individual frames. For instance in FIG. 2 the classification algorithm 210 discovers that the entire area 200 actually consisted of 4 objects. A first object is a rectangular window 201 that contains text and that has specific location and shape. In this particular situation location could be the coordinates of the upper left corner and the size could be height and width. However the present invention is in no way limited by the exact representation method. The second object is a rectangular window of type photograph 202 at specific location x' and with size z'. The third object 203 contains a video sequence. The object is of irregular shape 231 but it will be represented as a rectangle 232 with specific location and shape. In this situation also the pixels 233 that will contain padding will be described, possibly by listing these pixels 233 or by describing the pixels as a collection of one or more other objects (for instance the padding area consists of a number of rectangles with specific location and size and triangles with specific location and size). In the same way a last object detected is of type background 204. The object also is of irregular shape but for the ease of encoding it will be represented as a rectangle with specific location and size. Again, also the padding pixels will be described. The classification algorithm can work on a frame-by-frame basis or can take multiple frames as input. Taking multiple frames as input makes it for example a lot easier to detect video sequences. As an alternative to only using a classification algorithm, the applications generating the images/video could give a hint to the encoding algorithm (or alternatively the user of the application could give this information to the classification algorithm or to the application that then passes it to the classification algorithm). In this case the application that generates the text window for instance can communicate to the classification algorithm that the application generates a window with image type text and that this window has rectangular shape with specific position and size. Of course it is possible that the application communicates only part of this information (for instance only image type) or that it communicates more information (for instance desired compression algorithm, sensitivity to latency for this application, maximum allowed latency, confidentiality level of the data or desired encryption algorithm, priority level, desired transmission protocol, desired transmission medium, . . . ). It is also possible that only some of the applications communicate information to the classification algorithm, for the other areas of the image/video to be encoded the classification algorithm will then classify without the hints.

Figure 3:
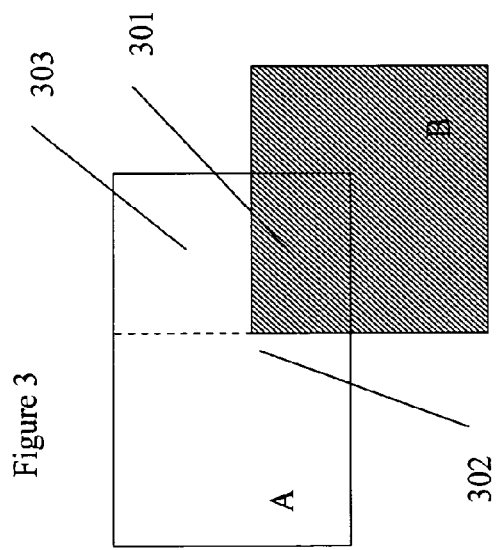
FIG. 3 schematically shows two areas overlapping in an image and/or video for transmission over bandwidth limited transmission channels having varying available bandwidth.

The object areas can be rectangular or could take any shape. It is also possible that one simplifies the detected area to a less complex shape. When supposing for instance that a circular area is detected containing a video sequence, and then it could allow for more simple compression (if the compression codec only accepts specific area shapes) if that circular area is extended to a rectangular area containing the circle and encoding that rectangular area. In that case padding of data can be interesting: the pixels in the rectangular area that are not within the circular area could be set to a constant value or any other specific pattern for the encoding purpose. It is also possible to overlay multiple areas in this way, as shown in FIG. 3: suppose there area two applications, each having a rectangular window, each having a specific image type, but one part of the first window is hidden with a part of the second window, then it could be interesting still to encode window A as a unit, but where the part 301 of window A that is covered by window B is replaced by padding pixels. Of course at the decoding side, one should replace the padding pixels in window A again with the pixels of window B that are on top of window A. The advantage of this approach is that since window A contains one type of image after replacing pixels of window B, the encoding of window A as a unit will be efficient without the need to split window A in multiple rectangular zones. Indeed, the alternative is to split window A into two rectangular areas 302, 303 having the same type of image, and then also encoding window B as a unit. In case one simplifies the detected area to a less complex shape one should be careful to avoid compression artefacts at the borders. Indeed: then one particular type of object can be encoded using two different compression schemes because the object shape does not match the simplified detected area. In that situation border/blocking artefacts can be visible. To avoid this problem one could pick compression algorithms with same characteristics (quality, type of compression artefacts, . . . ) so that the border will not be visible.

Based on the image types (also called object types) detected by the classification algorithms and possibly based on information provided by the applications that generate the images/video, the individual objects then are encoded with different image/video compression algorithms. These encoded data streams are then transmitted over the channel and at the receiver side they are decoded again and the objects are regenerated. Finally the complete image/video is reconstructed based on the composition of the individual objects where the effect of padding pixels is removed (for instance in case of overlaying windows or objects represented by other shapes than what the object in reality was). It is to be noted that the selected encoding algorithm could also comprise using specific error detecting or correcting codes, using specific encryption algorithms, using specific transmission protocols (UDP or TCP for instance), using specific transmission channels (for instance selection between Bluetooth or Wifi or UWB).

It is to be noted that the "image type" can be very specific. In the case of medical imaging for instance (but not limited to) one could distinct between "monochrome Chest Image", "Mammogram", "colour CT image", "colour ultrasound video sequence", "rendered 3D object" . . . . The present invention is of course not limited to any specific image types. Also an image type could refer to a particular type of application (such as a PACS viewing application in medical imaging) or even to one particular application (or even version of application) of a specific vendor.

Of course decomposing the image/video stream to be transmitted is done periodically (can be done for each individual frame or only once every few frames) so that changes in object types can be detected and taken into account. Alternatively the operating system or the applications can give a hint to the classification algorithm if a change has occurred. In other words: if the operating system creates, or changes state (position, size . . . ) of a window then it informs the classification algorithm so that a new object detection pass can be started. Also the application itself can inform the classification algorithm if its contents type has changed.

According to another aspect of the present invention, the used encoding algorithms can be adapted in real-time based on the current channel characteristics. Channel characteristics are for instance but not limited to: currently available bandwidth, variance on available bandwidth or statistics (for instance but not limited to min, max, mean, variance, distribution, time behaviour, . . . ) of available bandwidth, bit error statistics of the channel, statistics of latency introduced by the transmission channel, . . . . This could mean for instance that if the available bandwidth of the channel decreases, that then some (for specific object types) or all of the image/video compression codecs will be reconfigured in order to have higher compression ratio or that other codecs are selected for some or all object types. Alternatively if the number of bit errors introduced by the channel increases, then one could use better error detection codes or error correcting codes for one or more object types that will require more bandwidth but will result in higher quality at the receiver side. One could even measure (or estimate) the bit error rate at the receiver and then ask the sending device to change the error correcting code so that at least a minimum quality level (bit error rate for instance) is obtained. Also the nature of the bit errors (burst errors, single bit errors . . . ) could be used to automatically select the most suited error correction or error detection code. Alternatively if the latency on the channel increases, then one could select compression algorithms with lower latency for one or more object types in order to have lower overall latency (latency of encoding/decoding and of the transmission channel). Alternatively if the variance of the available bandwidth is rather high then one could increase the compression ratio for one or more object types in order to avoid temporary congestion of the network. In this case one could increase the compression ratio for object types that are considered to have lower priority (such as text data) or for applications that communicated "low priority". One could also assign priority to specific devices. For instance if a device is a portable display that receives images from a server through a wireless network and if there are multiple devices, then it is interesting to also assign priority to particular devices. For instance if in a hospital environment those devices are used both in the emergency room and also in regular doctor's offices then it is obvious to give priority to the devices used in the emergency room if available network bandwidth is low. Giving priority to a device could mean in this case assigning more bandwidth to higher-priority devices so that image quality is higher and user interaction is more fluently or could mean reducing available bandwidth for lower-priority devices or even disconnect (temporarily) the devices with lowest priority completely so that more bandwidth is available for high-priority devices. Deciding whether a device is high or low priority could be done by assigning priority to physical devices: for instance, devices intended for use in emergency room could have built-in higher priority level. Alternatively it could mean deciding on priority based on the location where the device is being used (for instance the same device has higher priority if used in the emergency room than if used in a doctor's office). Alternatively it could mean giving priority based on the user that is using the device: for instance if a doctor is logged on to the device (or uses the device, this can be checked through password, fingerprint reader, iris scan, voice recognition, photo ID, . . . ) then this device will have higher priority than if a nurse was logged on to this device (or uses the device). Determining who uses the device could be by means of a logon procedure with username and password or by means of a fingerprint reader or by means of a security token, . . . . Alternatively priority of a device could be determined based on the applications accessed through that device. For example: if a device is only used at a particular moment in time to read email then this device will be assigned lower priority than same device when used to review medical images. Of course any combinations of one or more methods to determine priority as explained above are also possible.

It is to be noted that measuring the total latency of the system can best be done by actually measuring the time between an action of the user and the response to this action. For instance, when the user performs an action (such as for instance but not limited to, a mouse movement, a keyboard command, a mouse click, . . . ) then a timer can be started and the time can be measured until the modified image that is result of the user action is actually displayed at the client side. This measuring of latency can be done for the multiple codecs that are supported, for the available transmission channels, for the available error detection/correcting codes, . . . . In this way clear information can be obtained about total system latency. This information then can be used to configure the client-server system optimally. Another way of measuring latency could be done by embedding signatures in the images that are transmitted. In this case the client would send a command to the server to start the latency measurement procedure. When the server receives this command then the server can embed a (possibly invisible for the user) bitpattern in the image. The client then can look for this bit pattern. The time from sending the "measure latency" command to the server to the time where the bitpattern was found is also an indication for the total latency of the system. This method is less accurate however, because the server performs an abnormal operation (embedding a bit pattern) that is not necessarily a good indication for the latency of a normal operation such as moving a window, . . . . Moreover, at the client side the time when the bit pattern is detected is not necessarily the time that the bit pattern becomes visible for the user. Although somewhat less accurate, the second method still models the codec latency pretty good as the bitpattern is actually encoded and decoded by the codec that is used. One has to be aware that the bit pattern can be altered because of the compression/decompression, so care should be taken to make sure that the client can even detect the possibly altered bit pattern.

According to another aspect of the present invention methods are disclosed to increase security in case of portable devices. With portable devices it is often the case that information displayed on the devices is only intended to be used in a specific environment and is not to be distributed outside that environment. In a hospital environment for instance the HIPAA regulations protect the privacy of the patient by stating that medical data (including images) that can be linked to a specific patient (for instance because the patient name or ID is shown in the data) should not be distributed unless it is necessary for treatment or in the clinical interest of the patient (see the HIPAA regulations for more details). For example: a mammogram (breast X-ray) from a patient may only be shown on displays inside the radiology department and not be distributed outside the department unless all patient ID data is removed from the image. In the past this was easy to achieve by making sure that only the workstations in the radiology department could access the server with the medical images. If an image was to be distributed outside the radiology department (for instance to be reviewed by a colleague of another hospital) then all patent ID was first removed before sending the image. However, with portable devices and wireless networks the physical barrier between departments cannot be used anymore to protect patient privacy. Therefore, in one of its embodiments, the present invention discloses a new solution. In each device a method/system is included to determine the exact position of the device. This can be based for instance on GPS (outside in open air) or on RFID-tokens inside a building or any other method such as checking which access point was used by the device. Yet another method to obtain position is to check which access points can reach the device. Typically each wireless access point can access (roughly) devices in a sphere with a specific distance as diameter. By checking which access points can access the specific wireless device and by measuring latency to these access points one can easily limit the possible locations where the portable device can be. As a refinement one could replace the easy model that defines the range of an access point to real measurement data instead of the easy "sphere" model. The exact method used to determine the position is of course not relevant for the present invention. Based on the exact position of the device the server will determine whether or not a device is authorized to connect to the server and/or to receive the specific data (for instance a mammogram with patient ID present) that was asked for. If authorization is granted then the server transmits the data to the client over the (wireless) network but encrypted so that only that particular client is able to decode the data. Of course it is possible to add extra conditions to give authorization to a client to see specific data. Examples are a login and password, a fingerprint scan, a particular device ID, . . . . To enhance security it is possible to only transmit confidential information through a wireless access point that is located inside the area where the data can be accessed. In that way a possible attacker will need to be physically very close already to the confidential area before having the ability to attack the security system. Since the device is a portable device it is required to avoid that the confidential data is distributed outside the allowed area. This can be done by automatically removing the confidential data from the device if the device leaves the authorized area. For instance: if a mammogram with patient ID data is shown on a portable display and the radiologists leaves the radiology department then the device should automatically remove the confidential data from the display and also clear all cached instances (for instance in memory or on the hard-disk or other versatile and/or non-versatile storage). Removing the confidential data could mean completely clearing the display (and possibly clearing cached instances for instance in memory or on the hard-disk or other versatile and/or non-versatile storage) when leaving the authorized area. Alternatively, removing confidential data could mean removing all confidential parts from the displayed image (and possibly clearing all cached instances for instance in memory or on the hard-disk or other versatile and/or non-versatile storage) so that only non-confidential information is left visible when leaving the authorized area. In this situation this would mean that the viewing application is still visible on the display but the confidential image is removed or replaced by an icon or any other symbol indicating that this information is not to be distributed and cannot be viewed now. Alternatively removing confidential data could mean related to HIPAA regulation making all medical images anonymous and removing all data that could link a specific patient to the image displayed (and possibly also removing all cached instances for instance in memory or on the hard-disk or other versatile and/or non-versatile storage). In practice that would mean that a mammogram that is viewed in the radiology department and that has a patient ID visible, would still be visible outside the radiology department but the patient ID will automatically be removed when leaving the department. Alternatively removing confidential data could also mean encrypting confidential data (and possibly also encrypting all cached instances for instance in memory or on the hard-disk or other non-versatile storage) so that it is not accessible anymore or using another encryption algorithm or changing the encryption algorithm strength. According to HIPAA for instance this could mean that inside the radiology department images are stored on the hard-disk of a portable device and encrypted using a particular encryption algorithm. When leaving the radiology department however this data will be re-encrypted using a stronger encryption algorithm to comply with HIPAA regulations. It is obvious that the number of confidentiality levels is not a limitation for the present invention. For instance it is possible to have more than 2 security levels where the device would display less and less confidential data when the location where the device is used has lower and lower security level. On the other hand, the inverse can also take place: a portable device showing limited data outside an authorised area, can automatically be adapted to show more data, e.g. patient's details, when entering the authorised area. Again, this may be obtained by re-encrypting the data with another encryption algorithm, or by doing the inverse of the anonimisation step, i.e. re-load the data for linking the images to a patient.

Yet another aspect of the present invention is complying with radiation regulations. If the client device has multiple transmission channels available (such as for instance but not limited to Wifi, Bluetooth, Infrared, UWB, . . . ) then it can be that it is not allowed or not interesting to use specific transmission devices in specific situations. For instance: in a hospital environment it can be that Wifi is only allowed in public places in the hospital while it is not allowed to use Wifi in the intensive-care department (because of radiation power for instance).

Figure 4:
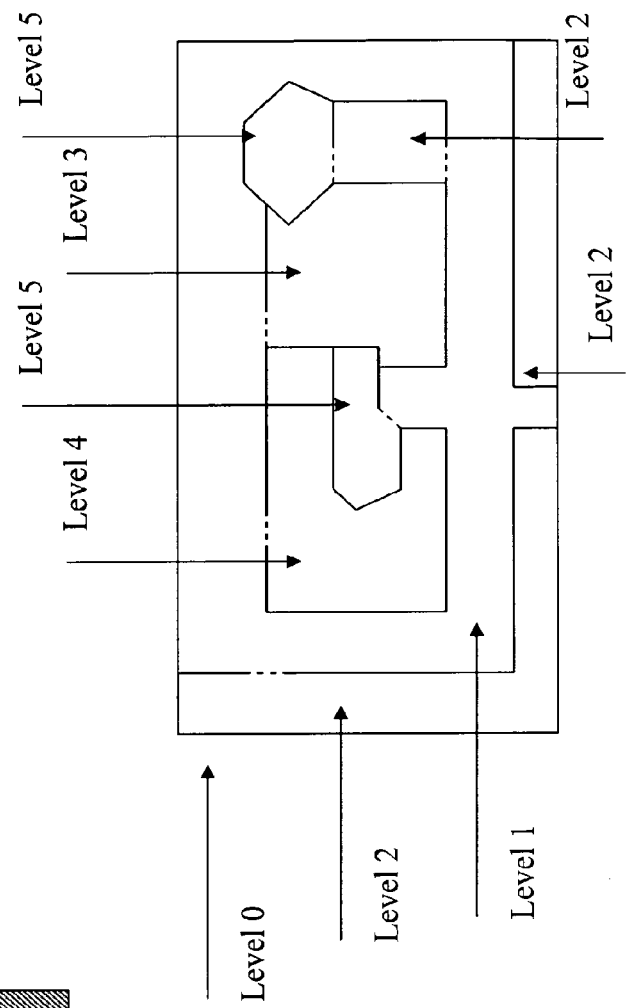
FIG. 4 schematically shows a hospital environment wherein a number of security levels are defined.

Another, non limitative example is shown in FIG. 4. In a hospital environment, six security levels, being level 0, level 1, level 2, level 3, level 4 and level 5 respectively are defined. Following definitions of security level are given to these levels:

Level 5: this is the highest access level, e.g. radiology department: Data requested or transmitted to this level will contain all data.

Level 4: e.g. emergency rooms: Data requested or transmitted to this level will contain image data being made anonymous.

Level 3: e.g. intensive care room: Data requested or transmitted to this level will contain image data being made anonymous.

Level 2: e.g. the patient room: Data requested or transmitted to this level will contain encrypted image data.

Level 1: e.g. the intra-hospital rooms: Data requested or transmitted to this level will only contain patient data.

Level 0: is region outside the hospital: all information will be removed from data requested or transmitted to this level, or all information will be encrypted.

According to the present invention the client device could autonomously decide which transmission channel to use based on the present location and the regulations in place at that location. This could for instance mean that if a doctor uses a portable device that is currently using the Wifi tranmission channel, and if the doctor goes into the operating room area, that then the device automatically switches from Wifi to for instance infrared or DECT transmission mode in order to comply with the radiation regulations in place in the operating room area. It is to be noted that it is not necessary that the client switches to another transmission channel. The client could for instance also reduce the radiation power when this is required. With the GSM standard for instance the client can emit radiation at multiple power strengths (measured in Watt), so reducing the emitted signal strength is also part of the present invention. The exact way how the client determines where it presently is located and the exact way how the information about acceptable transmission methods at specific places is stores is not a limitation of the present invention.

As a non limitative example, a hospital environment is shows, in which 6 zones are defined.

Zone 1: in this zone only GSM network is available.

Zone 2: in this zone, Wifi, DECT and UWB are available, next to the GSM network. There is no restriction for use of any of the transmission networks.

Zone 3: in this zone, Wifi and DECT are available, next to the GSM network. For the GSM network, only transmitting with limited power is allowed.

Zone 4: In this zone, there is infrared (IR) transmission available, next to all transmission possibilities of zone 3. Only DECT and IR are allowed.

Zone 5: In this zone, there is Ethernet transmission available, next to all transmission possibilities of zone 3. Only IR and Ethernet are allowed.

Zone 6: in this zone, Wifi, DECT and GSM are available; there is no restriction for use of these networks.

Portable devices can only use transmission channels that are both available at the portable device, and in the zone where the portable device is located, the portable device is only allowed to use the allowed channel in the zone where it is located. Possibly, the portable device will have to switch transmission channel if necessary.

Yet another aspect of the present invention is minimizing the required calculation power of a client while still supporting multiple compression protocols and algorithms. Since the present invention will use different image/video compression algorithms for different parts of the image, it is required that the receiver side (client) can decode all these image streams. However, since it is desired to select the best compression codec for each image type, it is to be expected that a tremendous amount of compression algorithms must be supported both by the server and the client. Moreover, the codecs used can change over time based on channel properties resulting in even more codecs to be supported both at client and server side. At the server side this is typically not a problem as the server (that generates the images/video) typically is a powerful workstation with lots of memory, hard disk storage and processing power. The client however is designed to be light and portable and therefore has very limited processing power. The present invention solves these conflicting requirements by disclosing a client at the receiver side that can be reconfigured at multiple levels. One way to achieve this is by providing a reconfigurable device (such as a processor, a FPGA, a DSP, a GPU, a CPLD, an ASIC that can be configured to perform multiple operations, . . . ) or any combination of such devices in the receiving client and to configure these reconfigurable devices based on the compression codec that is currently required. In other words: if the server sends a JPEG2000 stream to the receiving client then the client logic will be reconfigured in order to be able to decode this stream. Reconfiguring the client can be done by means of configuration code that is already present in the client device. One could for instance store configuration bitstreams for each codec that should be supported on a flash memory in the client device and the reconfigurable device (processor, FPGA, . . . ) would then be configured with the appropriate bitstream based on the currently required codecs. In this way it is not required to have support for all codecs available all the time at the client side and this of course reduces the amount of processing power and/or hardware resources that is required at the receiving client device. While this approach is useful in an environment where a limited number of codecs will be used it soon becomes impractical if a large amount of codecs must be supported because the configuration code for all these codecs must be available on the client device. Another limitation is that this method does not allow using new codecs that were not available at production time of the receiving client unless the client is updated. Therefore a better solution is to allow the client to be reconfigured completely or partly from the server. This means that the server will send the configuration code for the required codecs to the client making it possible to use any new codec that is available at the server side. Of course at the client side some logic must be present that makes it possible for the client to reconfigure itself after a new codec was sent to the client. This could mean for instance that the initial configuration of the client allows connecting to a server, downloading some codec, reconfigures the client functionality, and then connects to this or another server using this codec. Another alternative is that the client has a (limited) number of codecs available so that the client immediately is able to decode the server stream (perhaps with non-optimal quality). This means of course that in the beginning the server should send data to the client in such a format that the client can decode the data with the codecs that the client has initially available. The client then starts to download the new codecs that are needed for optimal performance while the client is already functional. Once the required codecs are downloaded then the client can be reconfigured and the server can use the new codecs. The exact method of transferring codec configuration data does not matter for the present invention. One possibility is to send the codec code through a separate connection between client and server. Alternatively one could embed the new codec code into the bitstream of an existing channel. This could mean for instance embedding the codec code into spare bits of a compressed video/image stream.

To avoid sending the same codec code over and over to the clients it is possible that the client device locally saves a copy of the all ore some codec code. In that way the client can communicate to the server that it already has available some codec and that there is no need to send the code again. This also means that at the beginning of a session the client can communicate a list of available codecs to the server. The server then can start streaming data to the client by using one or more codecs out of this list and can also (if needed and supported by the client) send new codecs to the client to further improve the efficiency or quality of the transmission. Additionally the client could also send a quality-level or performance-level at the client side for codecs supported by the client. The server then can take this information into account when deciding which codecs will be used for the transmission. For instance: a client could communicate to the server that the client initially has a JPEG-LS codec available, a raw-data transmission codec available, and a RLE-codec available. It additionally communicates to the server that the client is able to reach 10 frames per second for the JPEG-LS codec at resolution 1024×768 and 8 frames per second for the JPEG-LS codec at resolution 1280×1024, less than 4 frames per second for the raw-data codec with maximum resolution 1600×1200 and less then 6 frames per second for the RLE-codec with maximum resolution 1600×1200. Furthermore the client communicates that can accept from the server the JPEG2000 (with specific version that is compatible with the client platform) codec and can achieve with maximum framerate of 2 frames per second and maximum resolution 1280×1024. All this information then can be used by the server to determine which are the best codecs to use for communication with this client. Of course the client can also send other additional information such as but not limited by: the resolution supported by the client (for instance 1280×1024), the colour modes supported (for instance 16 bit grayscale, or 3×8 bit colour or 256 colour palette mode, . . . ), the frame rates supported by the client for different resolutions and colour modes, the type of network connection of the client, the battery level of the client (so that the server can decide to switch to a less power consuming codec at the client side), the list of preferred codecs of the client (codecs that will achieve high-performance and quality at the client side), the type of hardware available at the client side and the codec-requirements to be compatible with the client hardware, . . . . All this additional information can be used by the server to determine which set of codecs will give best performance for the transmitted stream. As an alternative to exchanging information about predicted performance of codecs, one could also just test all or a number of codecs and measure actual performance. In this case the server would send all or a number of codecs to the client. The client would try to configure the client device with that codec and if succeeded the server sends one or a series of test images or video data to the client using this specific codec that is tested. The client then tests if the codec has sufficient performance (this can be in terms of image quality, speed, framerate, latency, . . . ) and sends back the results to the server. Then this information can be used instead of estimates or predictions.

It is also possible to only reconfigure a limited part of the client. For instance if the client contains an FPGA then it is possible to configure a part of the FPGA to support some standard codecs and also reserve some part of the FPGA to implement some custom codecs if needed. In the same way these custom codecs could be stored in the client device in (non-volatile) memory or could be retrieved from a server when needed. For instance a JPEG-LS codec could be implemented by default in the FPGA and a JPEG2000 codec and a MPEG2 codec could be implemented temporarily in the device because they are needed for decoding the current data stream. Also this allows for parallel decoding of the streams associated to the different object/image types as described above. Alternatively if the client device consists of an FPGA and a processor, then the client device could decide to (partly) configure the FPGA for acceleration of some (or all) parts of a codec that takes to much time to execute on the processor or achieves too low quality on the processor. For instance: implementing a filter with a lot of taps would take a very long time to execute on a processor while it can be executed very efficiently on an FPGA, a DSP or a GPU. The same principle holds for other types of devices, this means if a client has multiple devices then the client could decide to execute parts of or the entire codec algorithm on specific devices based on performance or quality results/statistics or measurements.

According to another aspect of the present invention the typical latency problem will be reduced and hidden for the user. When there is interaction between client and server latency often is a major problem. For example: an application runs on a server and the desktop of that server is transmitted and recreated at a client device connected to the server using a wireless network. If the total latency between client and server (this means encoding latency, transmission latency, decoding latency, application latency at the server side, and feedback latency from client to server) is very high then this will result in a system that is perceived by the user as being slow and non-responsive. For example: if the user at the client side would click a button then it could take 20 ms to send that button-click message to the server. The server might need 10 ms to react to the button-click, the encoding of a modified image could take 20 ms, the transmission of the encoded image could take 10 ms, the decoding of the encoded image could take 30 ms and displaying the modified image at the client side could take 15 ms. In that case the total latency would be 105 ms meaning that only after 105 ms the user would see the result of clicking the button. It is obvious that a large latency will result into a slow and non-responsive system. The present invention solves this problem by reducing the latency and by hiding the latency for the user of the device. Reducing the latency in the system can be achieved by splitting the data to be transmitted into latency-critical and non-latency-critical data. If the data to be transmitted is a typical windows OS desktop with a spreadsheet, a video window, a taskbar and a background, then not all of these components are as critical to latency. Working in a spreadsheet for instance requires low latency because the user very frequently interacts with the data and expects rapid response. A video window where a movie is shown for instance is totally not sensitive to latency. The user won't even notice if the movie is actually delayed 2 seconds. Only in the beginning the video latency will be visible because the video stream will only start after 2 seconds, but typically this is not considered to be a problem. Also the desktop background can tolerate large latency. A desktop background change is often considered as very low priority and almost nobody will care if it takes 5 seconds to see the effect of the change. In a bandwidth-limited channel it often happens that packets are queued to be transmitted because the channel is operating at (almost) maximal bandwidth. In such a situation one can give priority to packets that are part of a stream requiring low latency. Also for the object types (see above) that require low latency one could select a codec that has low latency compression and decompression. To know whether or not an object is sensitive to latency one can detect the object type using the classification algorithm described earlier or one could receive hints from the application (or a window/part from the application) or from the user of the system. Also if multiple transmission channels are available (for instance but not limited to Wifi, Bluetooth, Infrared connection . . . ) then one can select the low-latency channels for streams that require low-latency.

As an alternative method to improve the latency problem the present invention discloses methods to hide the latency for the users of the system. This can be achieved by locally performing latency-critical operations on the client. One example is to locally generate the mouse pointer. The mouse pointer is a very latency-critical object since it is extremely visible if the pointer lags behind the movements of the mouse. To solve the problem the mouse pointer can be generated locally on the client instead of on the server. This means that if the user moves the mouse then this message ("move mouse to coordinate [x,y]") will be captured by the client, and the mouse will be rendered at the new position locally by the client. Of course the location change will also be forwarded to the server because it is possible that extra-side effects (such as change of mouse pointer shape or highlighting of text below the pointer or any other reactions from the application running at the server because of the moved mouse pointer) would occur at the server. Of course these side effects then are transmitted from server to client and displayed at the client side. Locally rendering of the keyboard is also interesting since it is very annoying if the symbols that are typed lag behind hitting the keys. Locally rendering the keyboard would mean for example that in a text document the symbols are rendered and displayed directly at the client and again also forwarded to the server. Apart from keyboard & mouse it is also possible to perform other operations locally. One example is using local lookup-tables. In medical imaging for instance one very often uses lookup-tables to perform window/level operations. Window/ level is a kind of contrast enhancement by applying a lookup-table to an existing image. Typically the mouse is used to control the brightness and contrast of the image and therefore to change the contents of the lookup-table. Each time sending a new image from server to client when the window/level settings are changed is not only very bandwidth consuming, but also the window/level operations would be very slow due to the latency introduced because of transmitting images from server to client. Therefore a good solution is to apply the lookup-table locally at the client side.

Then there are still two alternatives. One could send the mouse commands to the server who then creates a new lookup table. This table can be sent to the client and the client then can locally apply the look-up table to the image that is already present at the client. The second alternative is that the client also locally processes the mouse command and locally creates the new contents of the lookup-table. The image is then adapted on the client side based on the newly created lookup table. Of course the mouse command is also sent to the server and the server will respond with the correct lookup table. The client then checks if the locally generated lookup-table was correct and replaces if necessary its lookup table by the new one received from the server and again processes the image locally. It is to be noted that the present invention is not limited to only one lookup table. It is possible to have multiple lookup-tables for different parts of the desktop or even to have different lookup tables for different windows or applications. It is also possible to have lookup-tables in parallel or in cascade (in series).

An extension (a generalisation) to the approach of local lookup-tables is using local filters. In this case the client will locally perform operations that can be handled efficiently at the client side if these operations can be clearly defined from the server side. In other words: if the client is capable of efficiently handling a specific operation locally and if that operation can be described clearly by the server to the client then it can be favourable to indeed handle this operation locally for latency reasons. One example could be performing specific image processing filters locally. Suppose that the same image is shown on the desktop in colour (define this as image A) and in greyscale (define this as image B). Then it can be interesting for the server to send the definition of the transformation that transforms image A into image B to the client. This could be for example: $B(x, y)=R[A(x, y)]*0.30+G[A(x, y)]*0.59+B[A(x, y)]*0.11$. Or in other words: this formula explains how image B can be created from image A by calculating a pixel-by-pixel weighted sum of the red, green and blue subcomponents of each colour pixel. This approach will decrease the required bandwidth between client and server and will also decrease latency as part of the operations can be handled locally. Another example would be applying a filter on a part of an image and where this part of the image is selected by the mouse. Suppose a medical image is shown on the desktop and by means of the mouse the user can move a square over the image. In that square the image is filtered. In this situation the server could send the description of the filter to the client and the client could then locally apply the filter to the image. This will greatly decrease the required bandwidth and also the perceived latency will be significantly decreased because the filter is applied locally at the client. It is to be noted that (part) of the reconfigurable logic of the client can be perfectly used to perform such operations.

Yet another technique to hide latency for the user of the display is to predict parameters, send predicted parameters to the server and cache results from the server locally at the client so that the results are already available when the parameters are actually valid. Such parameters could include but are not limited to mouse commands (location, button operations, . . . ), keyboard commands, value of certain environment variables or program variables, or any combination of such features, . . . . The exact method to predict these parameters is not relevant for the present invention. Some possibilities are using interpolation of mouse trajectories (predicting the next position of the mouse by trying to fit the past mouse trajectory with a curve and then predicting the new mouse position by means of the fitted curve), just trying out all or some parameter values in the neighbourhood of the current value, trying out a limited number of random values in the neighbourhood of the present parameter values, . . . . For predicting parameter values one can use techniques from computer architecture. There techniques have been developed ("value prediction") to predict the contents of registers. As illustration an example is provided: if the user makes a slow continuous movement with the mouse then the most likely the future positions of the mouse can be predicted with rather high confidence. In this situation it is interesting to send the predicted mouse locations to the server. The server then will respond with a modified image based on the predicted mouse position. The client should then cache this image together with the mouse predicted position that corresponds to this image, the image itself is not displayed at this moment. If the predicted mouse positions (or some of the predicted mouse positions) were correct (in other words if the user actually moves the mouse to one or more of the predicted positions), then the client can immediately show the cached images corresponding to the correct predicted mouse positions instead of having to wait for the response of the server. If the predicted mouse positions were not correct then the client can do two things. The first possibility is to send the actual mouse position to the server and wait for the image corresponding to this actual mouse position. The received image then can be displayed on the client together with this correct mouse position. This approach will result in higher latency and slower response but the displayed image will be completely correct. The second possibility is to show the mouse pointer at the correct location on the client, but to display a cached image on the client corresponding to a mouse pointer location that is likely to be very similar to the actual mouse pointer position. In other words: suppose that the mouse pointer is actually at location (10, 10), but there is no cached image available for mouse pointer location (10, 10). It could then be decided to use the cached image that corresponds to mouse pointer location (11, 11) because it is believed that this image will not differ a lot from the image that corresponds to mouse pointer location (10, 10). The mouse pointer itself should of course be shown on location (10, 10) at the client because otherwise there will be discontinuities in the mouse pointer movement. The decision to use approach 1 (only use correct images) or approach 2 (still use cached images if parameters do not match completely) can depend on the particular application being executed on the server, on the object type being shown, on the user logged in, on the available bandwidth of the channel, on the preference of the user, or on any other condition. The exact method used is not a limitation of the present invention.

The same principle of predicting parameters can be used for other things such as but not limited to sliders, selection buttons, drop-down boxes, . . . . Also the same approach of predicting parameters is valid for higher-dimensional parameter vectors. In other words: the image rendered by the server could be a combination of several parameters or parts of parameters. For instance: the rendered image could depend on the column-location of the mouse pointer and the status of a selection button. It is even possible to actually find correlation using statistical methods between parameter or parameter vectors and rendered images. Such an analysis could for instance make clear that the rendered image is dependent only on the ratio between column position of the mouse and the value of a parameter field. In that situation the predicted values send to the server would be such that only combinations of those parameters that would render different images will be sent to the server, and also cached images can be used on the client if the ratio of predicted column position of the mouse and the predicted value of a parameter field are the same as the ratio between current column position of the mouse and the current value of a parameter field.

Of course, if a cached image corresponding to an earlier predicted parameter is used on the client, then still the current parameter is sent to the server. This means that then the server will respond by sending the new rendered image corresponding to this new parameter situation. To further decrease required bandwidth the server could also cache (some of) the combinations (parameters, rendered image) on the server side. If the server then detects that the rendered image is the same as the one that was sent earlier for the same parameter values, then the server can only send a message that it is the same image instead of sending the image itself. This reduces the required bandwidth. Alternatively, if the server does not cache the rendered image then still the server could send a checksum (CRC) of the image instead of the image itself. Indeed, suppose the client sends a predicted parameter value and the server responds with a rendered image. Some time later the client actually needs the image for this parameter value. The client uses the cached image but still sends the parameter value to the server. Since the server did not cache the image the server does not know that the image is the same as the image that was sent to the client earlier (however, the server did keep track of previous parameter values so that the server knows that an image for this parameter value was sent to the client earlier) the server sends a CRC of the image to the client. This CRC is only a very short message requiring very low bandwidth. The client now can calculate the CRC of the cached image for this parameter value to the CRC that the server sent to the server. If they match then there is a very good probability that the cached image and the new image rendered by the server are the same. In the other situation the client asks the client to send the rendered image for this parameter value anyway because the images differ.

It is to be noted that the described method can also be used for any part of the data to be transmitted from server to client. In other words: it could be that a parameter value only has influence on a particular area on the display while the remaining area of the display is uncorrelated or is correlated to other parameter values. This means that the method of sending predicted parameter values to the server could be done in parallel for multiple areas. An obvious optimisation in such a situation is to also send the desired area to the server. If indeed a particular parameter value only has influence on one particular area of the total image, then it has no use that the server each time sends the complete image while only a part is correlated with the parameter value. Only sending the parts that the client is interested in further reduces the required bandwidth.

Of course the method of sending predicted parameters and then using cached images only works if a clear correlation can be found between the parameter value and the images. If for instance a movie is played and the mouse movements have no effect on the movie then it also has no use to cache images together with mouse positions. There are several methods to test whether or not the approach of predicting parameters and using cached images makes sense for a specific situation. A first method is to try in advance if the parameter value is correlated with the image. This can be done by sending multiple parameter values to the server, then examining the resulting images and verifying if exactly the same images (or sufficiently similar images) are regenerated if the same parameter values are sent a second time to the server. This approach can be repeated if necessary to verify in time if the correlation between parameter values and images is still sufficient. A second method is to just start using the system of predicted parameter values and cached images and checking if the system is useful when the images are verified. Indeed: first predicted parameter values are sent to the server and the generated images are cached at the client side. If later on the parameter values equal earlier predicted values, then the cached images can be compared (or the checksums of the images) with the new images generated by the server corresponding to the same parameter values. Based on the degree of similarity the approach of using predictions and cached images can be continued or stopped. The decision whether or not to use the prediction method can also be based on any other condition such as preference of the user, type of application running at the server, type of image object, . . . . This exact decision method does not limit the present invention. If the client concludes that there is no or insufficient correlation between parameters sent to the server and generated images by the server, then it is best to stop using the prediction scheme to avoid risk of faulty states at the server side. Indeed, if as a reaction to a predicted parameter the server enters another not intended state then this was done unintentionally and certainly not intended by the user. This results in confusion of the user, as the new server state has to be displayed at the client side in order to give the user the possibility to get back to the original server state. For instance if the client would send as predicted value to the server the combination of "hold left mouse key" and "new mouse position (x, y)" and as result of this action the server activates another window, then this state has to be shown on the client because otherwise the state of the server and the state that is shown on the client would be inconsistent. By showing this actual state on the client side the user can correct the problem by performing the necessary actions to get the server back in the correct state.

It is in most situations relatively easy to link generation of a new image on the server side to a parameter value sent by the client. In many situations the image generated by the server will be static (or at least part of the image will be static) and will change shortly after the client sent a parameter value to the server. The client then can assume that the change of image was due to the parameter value sent to the server. A more reliable system is that the server adds a message to the generated image that links the new image to a particular action of the client. For instance, the server could add as metadata to an image that the image was the result of sending parameter value X from client to server. An additional refinement could be that the server postpones sending a new rendered image to the client until the image content of the server again reached a stable situation (after sending a parameter value from client to server), or until a maximum time has passed. For example: if the client sends a mouse location update to the server, and this mouse location update results in a small animation at the server side and then results in a new stable condition, then the server could wait for the stable condition to send an image update to the client. The advantage is that correlation between parameter value and image contents will be much more likely and that required bandwidth is further reduced. Furthermore it might be likely that indeed the animation is indeed a transition situation that is of no or low interest for the user so that not sending these information/images to the client will not pose a major problem. The disadvantage is that indeed the animation will not be visible for the user of the client. The server could additionally label the images sent to the client with the time that was needed to reach the stable condition after the parameter value sent from client to server was processed. Also if no stable condition was obtained then the server could send this as metadata to the client, the client then can make use of this information, for instance by concluding that this parameter or set of parameters might not be correlated with image contents that were examined. Also the client could inform the server whether a parameter value sent to the server is a predicted value or an actual value. If it is a predicted value then the server could indeed wait for a stable condition while if an actual value it might be more interesting to immediately process the parameter update. Also if the server knows that a parameter sent to the server is a predicted value, then the server can save its local state. Indeed: if the parameter value is a prediction then there is a possibility that if the prediction turns out to be wrong, the server arrived in a wrong state because of using the predicted parameter value. If the server first caches its state before using the predicted parameter value, then it is always possible to return to the correct state if the prediction turned out to be wrong, or even by default go back to the state before the prediction was used. The state of the server comprises all information that is required to undo the effects of using a predicted value. For example: the client informs the server that a prediction of the mouse position needs to be processed. The server first saves it state (this could include but is not limited to: window attributes such as in front/back, minimized, maximized, size, position, important program variable values, . . . ) and then executes the "change mouse position" command locally. The server then sends back the result (rendered image) to the client. Then the server restores its state so that the server remains in the correct state if later on the predicted mouse position turns out to be wrong. This by default restoring of the state is in theory not always required. If using the predicted parameter value does not change the state then of course it has no use restoring the state. However, suppose that because of using the predicted mouse position another window is activated, and then it is absolutely required to restore the correct state before processing any other predicted parameter values from the client. Indeed, because using a predicted parameter value can result into another server state it is also possible that because of this the reaction of the server to a new predicted parameter value sent by the server will be different compared to the situation where the first predicted parameter value would not have been executed by the server.

It is to be noted that in most situations it will not be a problem if there is a small error on the predicted parameter value. In other words: in most situations it will not be a problem to use a predicted parameter value that is not the same but is close to an available predicted parameter value. This of course can be dependent from application to application. Whether one uses these incorrect predicted parameter values can for example be made dependent on the type of application or can even be decided on basis of a list of individual applications. Of course the application could also communicate to the encoding algorithm whether or not using wrong predicted parameter values is acceptable or not. Alternatively the user could select this and give this information to the encoding algorithm, possibly through the application.

According to another aspect of the present invention a series of cached images will be stored at the client side and optionally also at the server side. When the server sends an image to the client then the client could decide to cache that image locally if the client believes that this image will need to be transmitted in the future again. At the server side the server could also cache this image or could cache a checksum (for instance CRC or hash) on this image. If the server then in the future finds out that an image needs to be sent to the client and that this image was sent before to the client, then the server can first send the CRC or hash value of this image. The client then can check whether or not this image is available at the client side. This can be done by verifying the CRC or hash value that was sent by the server to the client. If the image was indeed cached at the client side then the client can immediately use this cached image so there is no more need to send the entire image over the transmission channel and this will of course reduce required bandwidth and reduce latency. If the CRC sent to the client does not equal any CRC of the images available in the client cache then the client has to send a request to the server in order to have the server transmitted the image anyway. At the server side the server can decide to store the entire image in the cache or only store the hash or CRC of this image in the cache. Indeed, to verify if the present image was sent already before the server can compare completely the present image with the images in the cache of the server, or alternatively the server can calculate the hash or CRC of the present image and compare this hash or CRC with the hash or CRC values available in the cache of the server. If the hash or CRC values of the present image to be transmitted match (equal) with the hash or CRC value of a previously transmitted image then the probability is extremely high that the images themselves also match. Only storing the hash or CRC value furthermore reduces calculation power at the server side because instead of comparing all images in the cache of the server with the present image, only the shorter hash or CRC values of the images have to be compared. Of course also required cache memory/storage is reduced. To reduce required calculation power at the client side, the server could by default also send the calculated hash/CRC value of the image that is being sent to the client together with this image. This removes the need for the client to calculate this hash/CRC value. The client then can immediately store the image in the cache together with the hash/CRC value that was calculated by the server.

Of course there is no need to store all images in the cache that are sent to the client. The client could decide to only store some images in the cache together with the according hash/CRC value. Alternatively the server could decide which images should be cached. This can be communicated to the client for instance by only sending a hash/CRC value together with the images that should be cached at the client side. The server could also explicitly send a command to the client to cache a particular image. Deciding which images need to be cached can for instance be done by just looking how many times a specific image occurred in the past. If this number exceeds a specific threshold value then the server/client could decide to cache this image for future use. Alternatively the application could give hints about key images to the server/encoding algorithm. These key images then can be cached. Of course any combination of the explained strategies for deciding which images should be cached are also possible.

Instead of using CRC/hash values to identify specific images the server could also just give a unique identifier to the images. One example is a simple numbering scheme. The server could for instance label the first image that should be cached by the client with number 1, the second image to be cached by number 2, and so on. If an image occurs again that was already sent before and was cached then the server can just send this unique identifier to the client. The exact method of uniquely labelling the images of course does not limit the present invention.

The server should also have the possibility to clear one or more entries in the client/server cache. For instance if the cache at client/server side is only 256 images in size then the server could send a clear cache command to the client once the cache is full and a new image needs to be cached. This command will result in clearing the cache at both the client and server side so that new images can be cached in the future. Alternatively the cache clearing can take place in a round-robin scheme. In other words: if 256 entries out of 256 entries are used then the first entry (number one) would be overwritten if a new image were to be cached. If another new image is to be cached then the next entry (entry two) would be overwritten. Alternatively the server/client could decide which cached images can be removed. For instance: if the server has an image cache of 256 images but the client has only an image cache of 16 images then the client could select cached images that are to be removed if a new image is to be cached based on a frequently-used statistic. In other words: the client will remove images from its image cache based on how much these images were used in the past. If the cache is full then the client will first remove images that were not/not often used in the past. In case of a server cache of 256 images and a client cache of 16 images this could mean that the pairs (image, CRC) at the client side are extended with a third value named "usage", that indicates how many times this cached image was used until now. If an entry has to be deleted because the cache is full and a new image has to be cached then the client will first remove the cache entry with lowest "usage" value. Alternatively, to reduce calculation power at the client side, the server could manage the cache at the client side completely or partially. For instance: the client could keep the usage statistic or could keep track of the cache status of the client side and decide based on this information what the best strategy is for the client cache. The server in this case will control the client cache or would give hints to the client cache. A very useful application can be in medical imaging. In CT reconstructed volumes the user typically browses through a large number of slices. This is done by pulling a slider with the mouse. The radiologist typically browses forward and backward a lot through the large number of slices. In this situation it is very likely that images that are displayed will be displayed again in the future. Indeed, suppose the radiologist looks at image 1, 2, 3, 4, 5, 6, and then goes backward again to 5, 4, 3, 2. Then these images can be reused from the cache. The simplest way of implementing this would be that the server just numbers the images and sends the images together with the number to the client. If an image has to be displayed that was sent in the past then the server can send the unique ID (number) instead of the image. It would even be better if the application itself can give hints to the encoding algorithm about how the images should be numbered. Indeed, the application itself that generates the images (slices from the volume) has the most knowledge about what slices are viewed and which slices are likely to be viewed in the future again. Another way of viewing this type of data (browsing through slices of reconstructed CT volumes) is by just looping through the slices. This means that the user hits a kind of play key and then the slices are shown in order, so slice 1, slice 2, . . . , the last slice and then the browsing automatically restarts again with slice 1, slice 2, . . . and so on. In this situation the application perfectly knows which images will be needed in the future. Therefore the application itself can also predict a parameter (slice number in this case), the server can generate the image for the predicted parameter (slice number) and it can already be sent as a combination (predicted parameter, image) to the client. Alternatively, the images corresponding to images that will be likely to be shown in the future can also be sent to the client as being images that should be stored in the cache but only if the client does not show/display these images immediately but just places them in the cache for possibly future use. This would mean in the case of going through a series of slices that the server would render the images (slice 1, slice 2, slice 3, slice 4) immediately and send these images to the client as being images corresponding to predicted parameters or as images to be caches. The images will then already be available at the client side by the time the images need to be displayed at the client side. To be more specific: suppose that the radiologist looks at the slices (images) in order (image 1, image 2, image 3, . . . ) at a rate of 2 images/second. Then the server could already send as much images as possible to the client (for instance 4 images/sec, namely image 1, image 2, image 3, image 4, . . . ) so that all these images already available at the client side by the time the client needs to display these images. This will reduce in very low latency (the images are available on-time) and increased perceived reaction-speed of the client-server architecture. Of course this system also works if the radiologist browses himself through the slices and possibly goes forward and backwards through the images (for instance by pulling a slider). If the server generates images in advance (possibly based on hints by the application) and sends them already to the client to be cached, then the images will be available on time even if the image viewing sequence is not completely regular.

It is a goal of the present invention to make it possible to replicate the desktop of a server anywhere else by connecting to it from a (wireless, portable) client device. The starting point is that all applications should be running at the server end and this to limit the maintenance cost of the client/server architecture. Indeed, if all applications are installed and run on the server then only the server needs to be updated if an application update is required. Also if better hardware/processing capabilities become available (such as faster GPUs or CPUs) then only the server needs to be updated and the performance of all the clients will increase as well. Therefore the conceptual design involves replicating the desktop contents of the server to a remote client display and allowing feedback from the client so that for the user of the client it appears as if the user was working locally on the server. In practice this could be implemented by using "screen-scraper" technology that just grabs the screen content of the server at any moment and encodes and transmits this screen contents to the client. The client then decodes this encoded data stream and regenerates the images at the client side. Any inputs from the user at the client side are sent to the server and the server (application(s) running on the server) processes these inputs. To allow the user to interact with the server at least a keyboard and mouse connection should be available. This can be done for instance by converting the analogue PS/2 signals of mouse and keyboard at the client side into digitally sampled signals and transmitting these digital samples to the server side. At the server side the sampled PS/2 signals are reconverted into an analogue signal again and are connected with the PS/2 input of the server. In this way the system will behave as if the keyboard and mouse were directly connected to the server. An alternative is that the keyboard and mouse at the client side are also processed locally in order to reduce latency. These techniques have been described above. It is also possible to support a USB connection at the client side. Here the problem is somewhat more difficult because the USB protocol requires strict timings and converting the USB signals to digital samples and reconstructing the analogue signal at the server side could take too much time and result into protocol problems. Also the USB is a bi-directional protocol. To overcome this problem solutions exist such as the "extreme USB" solution that handles a part of the USB protocol locally to overcome the strict timing requirements of the USB protocol.

Of course it should also be possible to connect with multiple clients to the same server. This can be done by using a multi-user operating system (such as Windows 2000 server or linux) where multiple user sessions can take place in parallel. In this case for each user that wants to connect to the server a session (having its own framebuffer) can be created. Each of these sessions then can be treated as a desktop that must be transmitted to a particular client. Another possibility in case there is no multiple-user support from the operating system is to create virtual windows. This could mean for example that for each client a window is created with the application that the client wants to run. All these applications however run in one user space of the single-user operating system.

However, only the windows belonging to each specific client are transmitted to that client. For example: if a server is intended to run a specific application that requires high processing power, and it is the intention that multiple users can use that application at the same time. Then for each user an instance of that application would be started and only the windows belonging to the instance of each specific user will be sent to that specific user. Alternatively, one could provide support for multiple users in the application itself. In that case the application would handle serving multiple users at the same time and only the windows/parts of the application that belong to the session of a particular user would be sent to that particular user.

Of course, all aspects of the invention that are described earlier in this text can be applied in this particular implementation. For instance but not limited to: locally handling some parts such as keyboard or mouse, locally executing some parts of the application to reduce latency, using the mechanism of predicting parameters and using images associated with these predicted parameters, caching images locally at client/server and uniquely identifying these images and sending the identifier instead of the image itself if the image must be sent again.

The invention claimed is:

1. A method for reducing latency in a client-server computer system, the server being adapted for generating data at least dependent on one or more parameter values, the method being used in a hospital environment and comprising the steps:

predicting possible reachable future parameter values, predicting possible future parameter values being performed by the client, after which these predicted parameter values are sent to the server;

generating data corresponding to the predicted parameter values, and sending this data to the client, wherein the parameter values are values for displaying images on the client and the generated data are medical images for displaying on the client, and the client caching this generated data corresponding to parameter values for future use, and if there is no or insufficient correlation between predicted parameters sent to the server and data generated by the server, then sending of predicted parameters is stopped; and wherein the generated data is sent to the client after a stable condition is reached after the predicted possible future parameter values are sent by client to the server, wherein if the stable condition is not reached, then the servers sends metadata to the client indicating that the predicted possible future parameter values are not correlated to the data generated by the server.

2. The method according to claim 1, wherein the client uses the cached data when a corresponding parameter value is set.

3. The method according to claim 1, wherein the client uses the cached data when a parameter value is set which falls within a predetermined range around the parameter valued for which the cached data had been generated.

4. The method according to claim 1, wherein the one or more parameter values are selected from mouse commands, location, or button operations, keyboard commands, values of environment variables or program variables, or any combination thereof, sliders, selection buttons, drop-down boxes, higher-dimensional parameter vectors.

5. The method according to claim 1, wherein the predicting can be selected by selecting all or some parameter values in a neighborhood of a current value by trial, selecting from a limited number of random values in a neighborhood of the present parameter values by trial, statistical methods for correlating between parameter or parameter vectors and rendered images.

6. The method according to claim 1, wherein the one or more parameter values only have influence on a particular area on a display while a remaining area of the display is uncorrelated or is correlated to other parameter values, and sending the predicted parameter values to the server is done in parallel for multiple areas of the display.

7. The method according to claim 1, further comprising the step of clearing the generated data from the client.

8. The method according to claim 1, wherein if the predicted new mouse position is correct, the client shows the cached generated data corresponding to the parameter values based on the mouse position.

9. The method according to claim 8, wherein if the predicted new mouse position is not correct, then an actual mouse position is sent to the server and a corresponding data is generated and sent to the client, or the cached generated data corresponding to the predicted mouse position that is similar to the actual mouse position is shown on the client.

10. The method according to claim 1, wherein the predicting is selected from predicting a next position of a mouse by fitting a past mouse trajectory with a curve and then predicting a new mouse position by means of the fitted curve.

11. The method according to claim 1, wherein the server also caches the generated data and the corresponding predicted parameter values, wherein if the server detects that a second generated data is the same as a first generated data sent earlier for the same predicted parameter values, then the server only sends a message that the generated data is the same.

12. A method for reducing latency in a client-server computer system, the server being adapted for generating data at least dependent on one or more parameter values, the method comprising the steps:
 predicting possible reachable future parameter values, predicting possible future parameter values being performed by the client, after which these predicted parameter values are sent to the server;
 generating data corresponding to the predicted parameter values, and sending this data to the client, and the client caching this generated data corresponding to parameter values for future use, wherein the predicting is selected from predicting a next position of a mouse by fitting a past mouse trajectory with a curve and then predicting a new mouse position by means of the fitted curve,
 further comprising testing if the one or more parameter values are correlated with an image; and
 wherein the generated data is sent to the client after a stable condition is reached after the predicted possible future parameter values are sent by client to the server, wherein if the stable condition is not reached, then the servers sends metadata to the client indicating that the predicted possible future parameter values are not correlated to the data generated by the server.

13. The method according to claim 12, wherein the testing is performed by sending multiple parameter values to the client-server computer system, examining the resulting images, and verifying if exactly the same images are regenerated if the same parameter values are sent a second time to the client-server computer system.

14. A client-server computer system configured for use in a hospital environment, comprising:
 a server adapted for generating data at least dependent on one or more parameter values; and
 a client adapted for predicting possible reachable future parameter values and for transmitting these predicted parameter values to the server, the server being adapted to generate data corresponding to the predicted parameter values, and sending this data to the client, wherein the generated data are medical images or videos that are for display on the client, and the client being adapted to cache this generated data corresponding to parameter values for future use, wherein if there is no or insufficient correlation between predicted parameters sent to the server and data generated by the server, then sending of predicted parameters is stopped; and
 wherein the generated data is sent to the client after a stable condition is reached after the predicted possible future parameter values are sent by client to the server, wherein if the stable condition is not reached, then the servers sends metadata to the client indicating that the predicted possible future parameter values are not correlated to the data generated by the server.

15. The client-server computer system according to claim 14, wherein the client is adapted to use the cached data when a corresponding parameter value is set.

16. The client-server computer system according to claim 14, wherein the client is adapted to use the cached data when a parameter value is set which falls within a predetermined range around the parameter valued for which the cached data had been generated.

17. The client-server computer system according to claim 14, further comprising testing if the one or more parameter values are correlated with an image.

18. The client-server computer system according to claim 14, wherein the predicting of possible reachable future parameter values is selected from predicting a next position of a mouse by fitting a past mouse trajectory with a curve and then predicting a new mouse position by means of the fitted curve.

19. The method according to claim 1, further comprising the step of clearing the generated data on the server and the client.

20. The method according to claim 1, further comprising the step of replacing generated data on the server with new generated data based on a frequently-used statistic.

21. The method according to claim 20, wherein the generated data that is not often used is removed first.

22. A method for reducing latency in a client-server computer system, the server being adapted for generating data at least dependent on one or more parameter values, the method comprising the steps:
 predicting possible reachable future parameter values, predicting possible future parameter values being performed by the client, after which these predicted parameter values are sent to the server; generating data corresponding to the predicted parameter values, and sending this data to the client, and the client caching this generated data corresponding to parameter values for future use, wherein the predicting is selected from predicting a next position of a mouse by fitting a past mouse trajectory with a curve and then predicting a new mouse position by means of the fitted curve, wherein, the server is adapted for generating data at least dependent on one or more parameter values, the method comprising the steps:
 predicting possible reachable future parameter values, predicting possible future parameter values being performed by the client, after which these predicted parameter values are sent to the server;
 generating data corresponding to the predicted parameter values, and sending this data to the client, and the client caching this generated data corresponding to parameter values for future use, further comprising testing if the one or more parameter values are correlated with an image; and
 wherein the generated data is sent to the client after a stable condition is reached after the predicted possible future parameter values are sent by client to the server, wherein if the stable condition is not reached, then the servers sends metadata to the client indicating that the predicted possible future parameter values are not correlated to the data generated by the server.

23. The method according to claim 22, wherein the predicting can be selected by selecting all or some parameter values in a neighborhood of a current value by trial, selecting from a limited number of random values in a neighborhood of the present parameter values by trial, statistical methods for correlating between parameter or parameter vectors and rendered images.

24. The method according to claim 22, wherein the one or more parameter values only have influence on a particular area on a display while a remaining area of the display is uncorrelated or is correlated to other parameter values, and sending the predicted parameter values to the server is done in parallel for multiple areas of the display.

* * * * *